ABSTRACT OF THE DISCLOSURE

A gunable refractory composition suitable for the gunning maintenance of the walls of arc melting furnaces comprising graphite or calcined coal, bauxite, silicon, aluminous cement and Portland cement.

BACKGROUND OF INVENTION

(1) Field of invention

The invention relates to gunable refractory compositions particularly suitable for hot or cold gunning maintenance of arc melting furnace walls, over graphite block or oxide refractories.

(2) Description of prior art

Electric arc furnaces are commonly used for melting iron and steel in foundry operations, using a process requiring relatively frequent charging, arc melting, and pouring. Refractory wear on the upper side walls tends to be quite severe due to mechanical gouging by metal scrap, slag action, and more particularly the tendency of the arc to strike the wall, in specific areas, causing localized overheated areas sufficiently hot to melt the highest melting normally used acid and basic refractory oxides.

Graphite refractory blocks have been most satisfactory in the areas where the arc tends to strike. These can be commercial machined blocks or cut from spent electrodes. Dense graphite does not oxidize rapidly, and wears better in critical areas than oxide refractories, since it does not melt or spall. However, the burning rate is sufficiently rapid to require a maintenance program to increase life to postpone expensive relining operations. Gunning is the most convenient maintenance method, but carbon or graphite gunned overlays rapidly oxidize. Inexpensive clay and quartz mineral compositions have been most satisfactory gunned over the hot linings usually once every 24 hours. This requires cooling off, even using water hoses, taking the furnace out of production for the period and thermally stressing the refractories.

We have developed a refractory gunning formulation for hot or cold gunning maintenance of arc melting furnace side walls, over graphite block and oxide refractories, with an accelerated cement system for rapid firming to withstand charging of scrap and prevent slumping in thick sections, and an open structure, having no clay fines, for steam permeability so that steam does not expel material from the wall, and a graphite base prevented from oxidation by highly refractory additions which develop a high strength fired bond.

SUMMARY OF INVENTION

Our composition is a gunable refractory, high in graphite or calcined coal content, with excellent oxidation resistance. It develops rapid strength on hot or cold gunning, so that it is not knocked off the wall during charging of scrap. Metallic silicon and bauxite, preferably calcined refractory grade bauxite, are present for oxidation protection of the graphite. Bonding is provided by a combination of calcium aluminate and silicate cements which achieve an accelerated set on hot or cold surfaces. The silicon provides good bonding on firing.

When the bauxite is not present, oxidation was apparently excessive. The addition of clays can result in loss of material by steaming off of hot walls. The cement preferably should be in the ratio of 2 parts calcium aluminate, using such products as Alcoa CA-25, Refcon, or Lumnite, to 1 part calcium silicate, preferably a highly early type for most rapid strength development. Graphite should be at a minimum of 40% to dominate the refractory properties; that is, impart infusible characteristics, with a 6 mesh or ⅛ inch size best for gunning. Grain sizings over ⅛ inch usually cause much more rebound, and finer graphite sizings result in dusting.

The composition can be formulated in the following range of percentages by weight:

| | Percent |
|---|---|
| Graphite, or calcined coal, ¼ inch diameter maximum to 100 mesh minimum sizing | 40–60 |
| Bauxite, ¼ inch maximum | 20–40 |
| Silicon, 0–5% Fe, 60 mesh maximum | 8–20 |
| Calcium aluminate | 6–16 |
| Calcium silicate | 3–8 |

The bauxite is preferably calcined to remove the water and is of the high alumina refractory type containing less than 15% of the oxides of iron, titanium and silicon.

The calcium aluminate may be in the form present in an aluminous cement containing at least 30% by weight of alumina.

The calcium silicate may be present as an ingredient of portland cement. There is no minimum grain size for the bauxite and silicon, 100 mesh and finer being suitable. The graphite and calcined coal are preferably present in 30 mesh or larger size.

DESCRIPTION OF SPECIFIC EMBODIMENT

The following formulation successfully provides protection for arc furnace walls, eliminating the need of daily maintenance:

| | Percent |
|---|---|
| Mexican graphite, −6, +30 mesh | 45 |
| Calcined refractory bauxite, ⅛ inch diameter x downs | 30 |
| Silicon, −100 mesh | 10 |
| Calcium aluminate cement (aluminous cement) | 10 |
| High early cement (H.E.S. portland cement) | 5 |

This material was applied pneumatically to the hot walls of a cooling arc furnace in thin layers as well as in several inches of thickness in eroded areas. The relatively coarse structure of the deposit was permeable by steam, preventing the loss of material by being pushed off by steam, a common occurrence in hot gunning. The quick firming action of the accelerated cement reaction prevented slumping. Upon completion of gunning, the furnace could be immediately charged and in operation, and a subsequent maintenance program would allow at least two days between furnace shut downs, but generally longer since this material can be used for emergency repair of the refractories, not feasible with the clay based materials now used.

The mesh sizes are U.S. Standard Screen. The terms "aluminous cement" and "portland cement" are defined in Reinhold, "The Condensed Chemical Dictionary," 7th Edition.

What is claimed is:

1. A gunable refractory composition comprising the following materials in parts by weight:

| | |
|---|---|
| Graphite or calcined coal | 40–60 |
| Bauxite | 20–40 |
| Silicon | 8–20 |
| Calcium aluminate | 6–16 |
| Calcium silicate | 3–8 |

2. A composition in accordance with claim 1 in which the graphite or calcined coal has a particle size of 100 mesh to ¼ inch diameter, the bauxite is calcined high alumina refractory bauxite of a particle size of not more than ¼ inch, the silicon contains not more than 5% iron and has a particle size of not more than 60 mesh.

3. A composition in accordance with claim 2 in which the calcium aluminate is present in aluminous cement and the calcium silicate is an ingredient of portland cement.

4. A composition in accordance with claim 3 in which the portland cement is a high early type.

5. A composition in accordance with claim 1 having the following materials in percent by weight:

| | Percent |
|---|---|
| Graphite —6, +30 mesh | 45 |
| Calcined refractory bauxite, ⅛ inch diameter maximum | 30 |
| Silicon, —100 mesh | 10 |
| Aluminous cement (containing calcium aluminate) | 10 |
| High early portland cement | 5 |

References Cited
UNITED STATES PATENTS

| | | | |
|---|---|---|---|
| 3,083,111 | 3/1963 | Nickerson | 106—56 |
| 3,227,566 | 1/1966 | Hilton et al. | 106—56 |
| 3,303,031 | 2/1967 | Shields | 106—56 |
| 3,442,670 | 5/1969 | Parsons | 106—64 |
| 3,520,526 | 7/1970 | Aldred | 106—56 |
| 3,775,140 | 11/1973 | Visser et al. | 106—56 |

JAMES E. POER, Primary Examiner

U.S. Cl. X.R.

106—64